United States Patent [19]

Mortensen

[11] Patent Number: 5,156,273
[45] Date of Patent: Oct. 20, 1992

[54] STACKABLE COMPOSITE LID AND CONTAINER ARRANGEMENT

[75] Inventor: Roger L. Mortensen, Excelsior, Minn.

[73] Assignee: Empak, Inc., Chanhassen, Minn.

[21] Appl. No.: 876,056

[22] Filed: Apr. 28, 1992

[51] Int. Cl.⁵ .............................................. B65D 75/00
[52] U.S. Cl. .................................... 206/508; 206/821; 156/321
[58] Field of Search ................ 206/808, 821, 503, 612, 206/613, 611; 156/320, 321, 322

[56] References Cited

U.S. PATENT DOCUMENTS

| | | |
|---|---|---|
| 2,957,601 | 10/1960 | Novick ................................. 206/503 |
| 3,173,574 | 3/1965 | Goldsmith ........................... 206/508 |
| 3,180,537 | 4/1965 | Collins ................................. 206/821 |
| 3,237,802 | 3/1966 | Wagner ................................ 206/821 |
| 3,317,087 | 8/1967 | Landis ................................. 206/821 |
| 3,331,527 | 7/1967 | Kaas et al. ........................... 206/821 |
| 3,397,814 | 8/1968 | Zackheim . | |
| 3,521,777 | 7/1970 | Vik ....................................... 206/821 |
| 4,141,463 | 2/1979 | Smith . | |
| 4,289,252 | 9/1981 | Helms . | |
| 4,418,834 | 12/1983 | Helms et al. . | |
| 4,442,971 | 4/1984 | Helms . | |
| 4,448,345 | 5/1984 | Helms . | |

*Primary Examiner*—Joseph Man-Fu Moy
*Attorney, Agent, or Firm*—Haugen and Nikolai

[57] ABSTRACT

A composite lid closure assembly, for use with a container body, comprising a paper board central panel coated on two sides with sealable material and bonded to a semi-rigid plastic lid ring. The lid ring and central panel are ultrasonically bonded together.

12 Claims, 4 Drawing Sheets

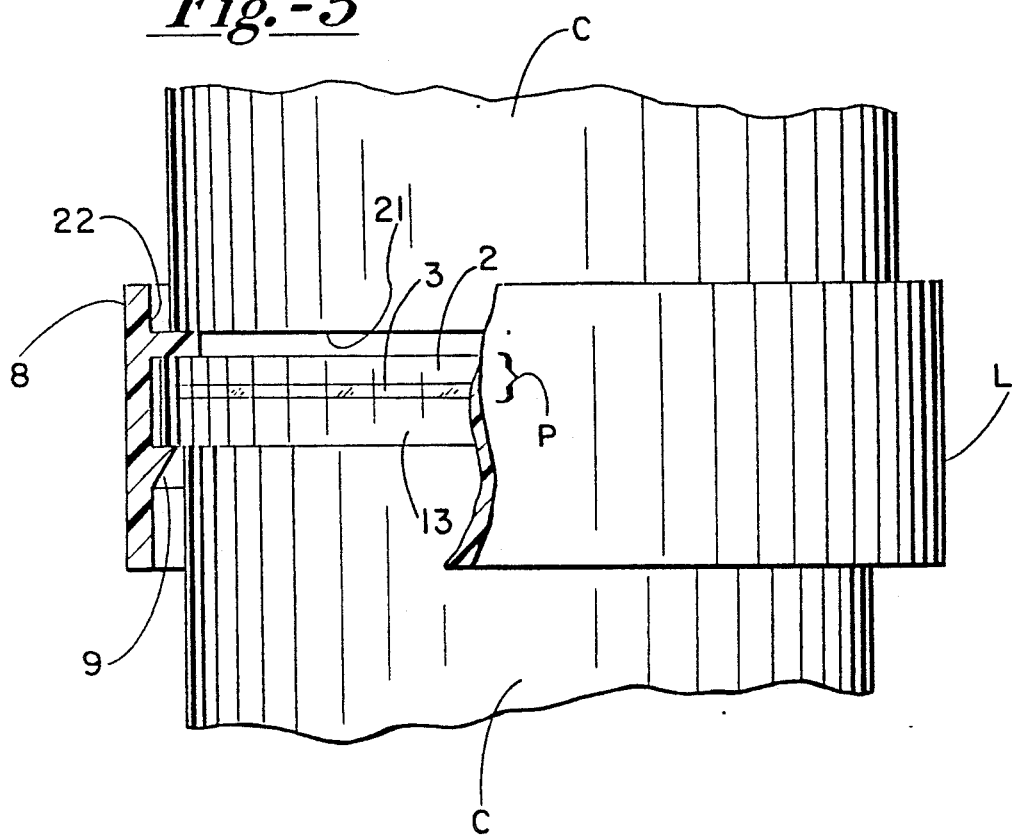
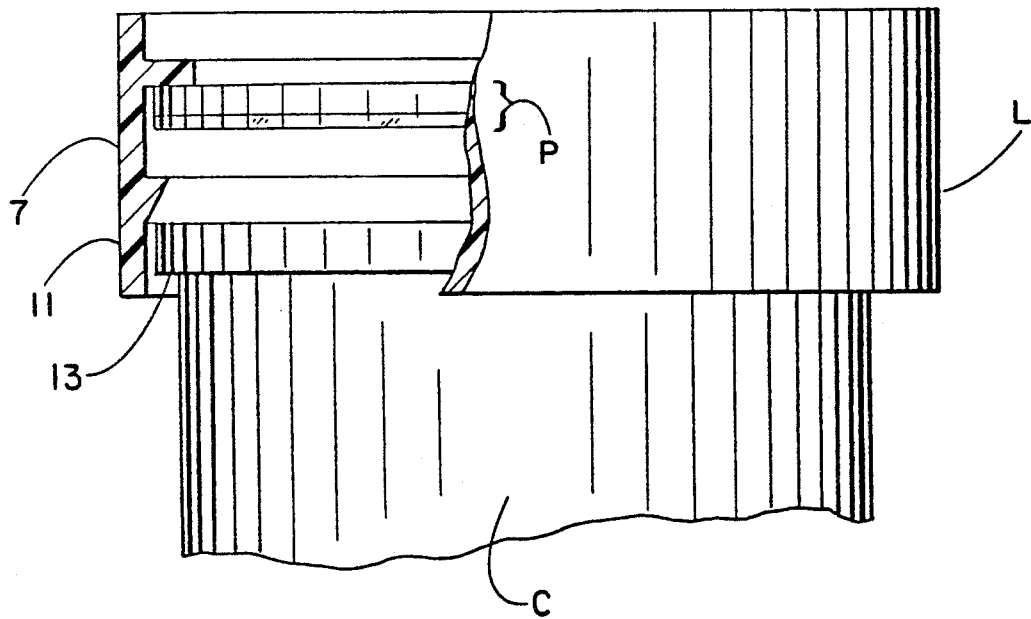

STACKABLE COMPOSITE LID AND CONTAINER ARRANGEMENT

BACKGROUND OF THE INVENTION

1. Field of the Invention

This invention relates generally to composite lid closure arrangements for use with containers. More specifically, the lid of the present invention includes a semi-rigid plastic ring and a central panel coated on two sides with a plastic material which is bonded, preferably ultrasonically, to the ring.

2. Description of the Prior Art

U.S. Pat. No. 3,397,814 discloses a basic composite lid having a central panel and plastic lid ring to engage a container rim. Unlike the invention described herein, the central panel of the '814 patent, made preferably of fibrous paper board, has no plastic coating on either side. The '814 patent uses injection molding, not ultrasonic bonding, to bond the central panel to the plastic lid ring.

In U.S. Pat. No. 4,141,463, a plastic lid is ultrasonically bonded to a container rim for hermetically sealing the container. The container rim was previously coated with a sealable material to accomplish ultrasonic bonding. However, the '463 patent does not deal with the concept of creating a composite lid by ultrasonically bonding a central panel to a plastic ring to form the lid.

Other inventions for achieving a closure arrangement using a composite lid or a membrane to hermetically seal a container include U.S. Pat. Nos. 4,418,834; 4,442,971 and 4,448,345. In each of these patents, the composite lid is built using an injection molding process for bonding the central panel to the plastic lid ring.

The '834 patent, for example, describes a laminated membrane structure comprising a foil disk coated on top and bottom with sealable material. A central panel is bonded to a plastic lid ring through injection molding. The laminated membrane structure is bonded to the central panel and container rim by inductively heating the foil. No ultrasonic bonding is used to bond the central panel to the plastic lid ring or to bond the laminated membrane structure to the central panel or container rim.

The '345 patent discloses a composite lid comprising a central panel which is bonded to a plastic lid ring by insert injection molding. A membrane, comprising a top layer of saran and a bottom layer of polyethylene, is attached to the bottom of the central panel with a conductive wax at the peripheral edge of the panel and membrane. The conductive wax is used for radio frequency bonding of the membrane to the central panel and container rim. Once again, injection molding, not ultrasonics, is used to bond the central panel to the plastic lid ring and radio frequency is used to bond the membrane. Nothing is ultrasonically bonded.

The '971 patent discloses another sealable enclosure that utilizes a plastic lid ring bonded with a central panel through injection molding. Heat sealing is also used for bonding, but not ultrasonics. The '971 patent goes on to describe how a hermetic seal is retained when internal gasses push the middle of the container lid up. The invention described herein, however, does not utilize the same mechanism for this feature. Instead, in the invention described herein, a larger depending vertical skirt and a vertical appendage above the central panel add mechanical strength to the plastic ring. The additional strength of the plastic ring resists distortion due to upwardly or downwardly pushing gas pressure thus retaining contact with the container rim.

Finally, U.S. Pat. No. 4,289,252 discloses a closure arrangement for two plastic rims. One soft rim, on the lid, and one hard rim, on the container, are forced together to hermetically seal the container. No composite lid is described and the sealing mechanism does not use heat or ultrasonios. The stacking of plastic lids described in the '252 patent does not involve the stacking of containers as described in the present invention.

From the above analysis, it can be seen that the prior art patents, individually and as a whole, do not disclose a composite lid enclosure arrangement comprising a central panel with coating on two sides which is ultrasonically bonded to a plastic ring.

SUMMARY OF THE INvENTION

This invention relates to a composite lid closure arrangement and it is an object of the invention to provide an improved composite lid and method of producing said lid by coating a central panel with a sealing material and ultrasonically bonding the central panel to a plastic lid ring.

Another object of the invention is to provide a composite lid composed of a semi-rigid lid ring to which is ultrasonically bonded a central panel made of a material to which indelible printing can be applied and a polyethylene or similar material coating each side of said central panel material.

It is also an object of the invention to provide an improved mechanism for fitting the composite lid onto a container using an extended depending skirt.

Finally, it is an object of the invention to provide an improved lid to facilitate stacking of the lid and container enclosure arrangements, one on top of the other. The bottom of a container fitting conveniently onto the top of different lid and container.

These and other objects of the invention will be apparent from an examination of the following detailed description of the preferred embodiment with reference to the drawings and the claims.

BRIEF DESCRIPTION 0F THE DRAWINGS

FIG. 5 is a fragmentary, vertical sectional view of the container bottom and the composite lid top in the stacked position;

FIG. 6 is a fragmentary vertical sectional view of the composite lid's depending vertical skirt fitting over the container rim;

It will be understood that for clarity certain elements may have been intentionally omitted from certain views where they are illustrated to better advantage in other views.

DETAILED DESCRIPTION OF THE PREFERRED EMBODIMENT

Figure 1:
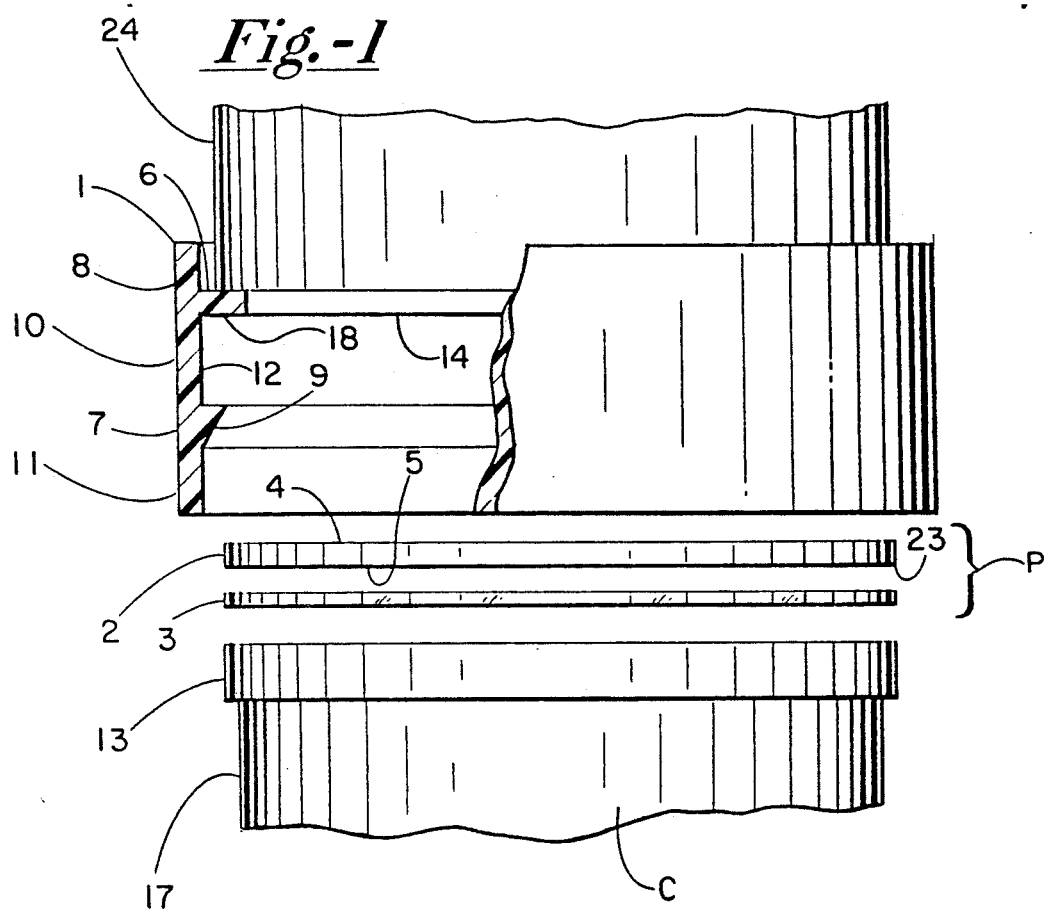
FIG. 1 is an exploded, fragmentary, vertical sectional view of the components of a composite lid and container embodying the features of the invention.
Figure 2:
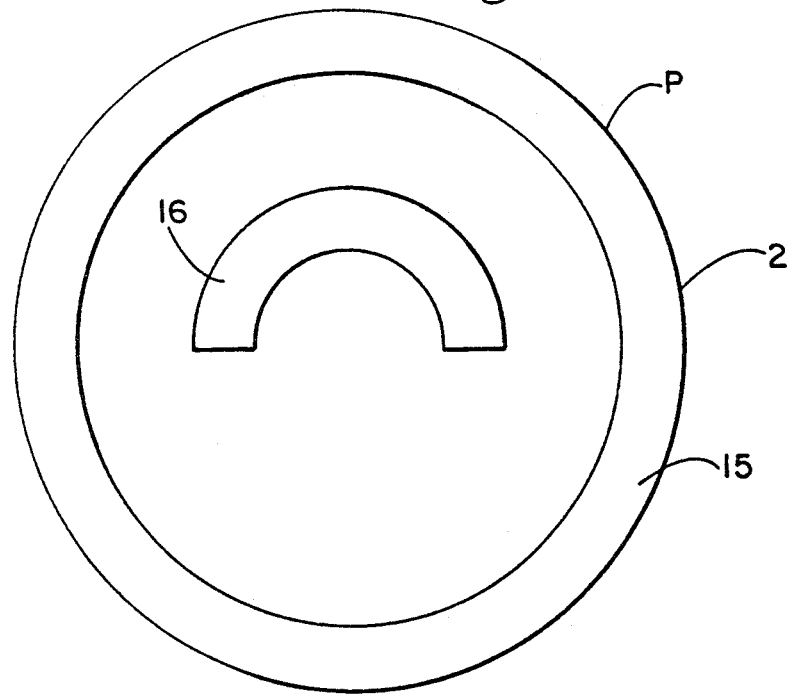
FIG. 2 is a view of a composite panel with an annular marginal area for bonding.
Figure 4:
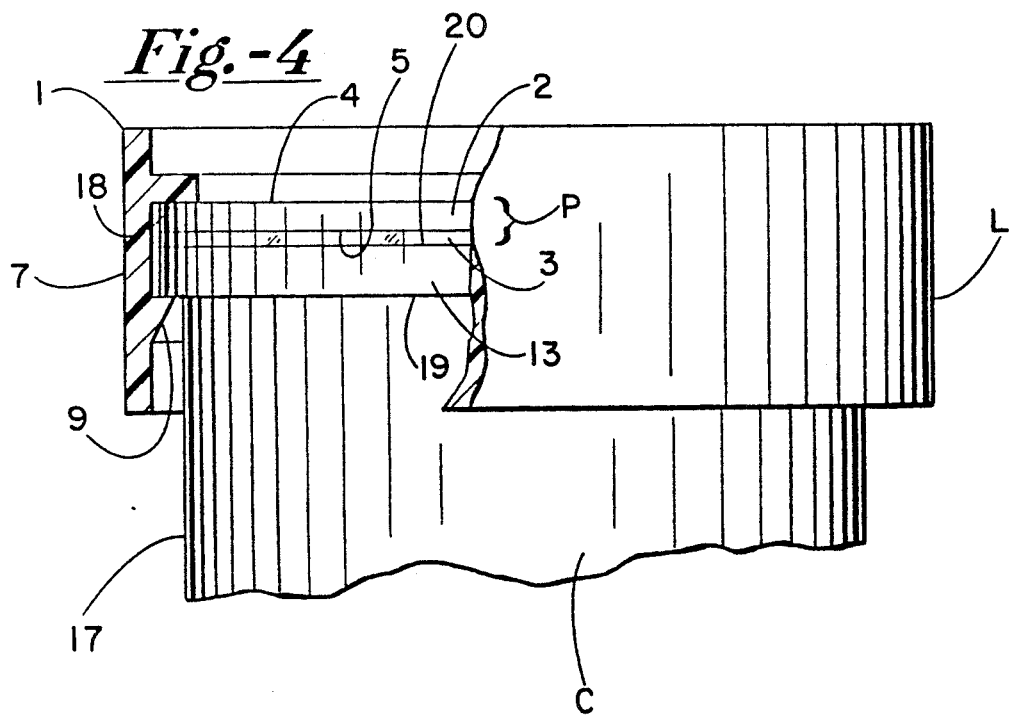
FIG. 4 is a fragmentary, vertical sectional view of the composite panel bonded to the plastic lid ring and the composite lid securely fitted onto the container.

The present invention consists of a composite lid L configured for a sealing arrangement with the rim 13 of a container C such as the one shown in the drawings. As seen in FIGS. 1 and 4, container C has a rim 13 at the top of a vertical side wall 17 which mates with the composite lid L. To seal the container C, the composite lid L is positioned over the container C and snappe into place with a downward force.

FIGS. 1, 3, 4 and 8 show composite lid L as comprising an annular plastic lid ring 1, a central panel 2, a coating of sealable material on the top 4 of central panel 2, and either a plastic membrane 3 on the bottom 5 of central panel 2 or a coating of sealable material on the bottom 5 of central panel 2.

The annular plastic lid ring has a horizontal inwardly extending ledge 6 having a first top face 26 and a second bottom face 18. The ledge 6 is molded with an outer depending annular skirt 7 and an integrally molded, outer, upwardly projecting annular appendage 8. Skirt 7 has an inwardly extending lip 9, which divides the inside of skirt 7 into an upper half 10 and a lower half 11. Lip 9, t he upper half 10 of skirt 7, and the bottom face 18 of the horizontal inwardly extending ledge 6 define an annular groove or recess 12 for receiving the composite panel P and the rim 13 of container C. The lower half 11 of skirt 7 is sufficiently recessed to fit easily over the container rim 13. The annular plastic lid ring 1 has a central opening 14 which is closed by a composite panel P.

As seen in FIGS. 1, 2, 3 and 8, the copposite panel P includes a central panel 2, preferably opaque, round and made out of a thin paper board material to which indelible printing of pictures and/or writing can be applied. The paper board central panel 2 preferably includes a cutout section 16 which permits one to view the contents of container C when container C is covered by the lid L. When the cutout section 16 is present in the paper board central panel 2, a transparent plastic membrane 3 is laminated to the bottom 5 of the opaque paper board central panel 2. The transparent plastic membrane 3 is preferably made out of an ethylene material 1-1.5 mils thick The membrane 3, because it is transparent and covers the area of the cutout section 16, forms a window for viewing the contents of the container C through the cutout section 16 when the lid L is in place on the container C The transparent plastic membrane 3 also serves to shield the paper board of central panel 2 from the contents of the container C and the contents of the container C from the paper board central panel 2.

Alternatively, when a cutout section is not present in the opaque paper board central panel 2, the bottom 5 of the central panel 2 is coated with a sealable material, such as polyethylene, similar to the coating put on the top 4 of central panel 2. This coating serves to shield the paper board central panel 2 from the contents of the container C and the contents of the container C from the paper board central panel 2.

The sealable coating applied to the top 4 of central panel 2 and, if applicable, to the bottom 5 of central panel 2 and the material used in the transparent plastic membrane 3 is nonconductive material, such as polyethylene.

After a coating of sealable material has been applied to the top 4 of central panel 2, and the bottom 5 of central panel 2 has been coated in one of the two ways described, the completed composite panel P is bonded to the plastic lid rim 1 ultrasonically. Ultrasonic bonding does not melt the annular plastic lid ring 1 to the coated central panel top 4, but achieves a bond through applying ultrasonic energy and a compressing force, vibrating the materials and causing them to merge together. The bottom 18 of the annular plastic ring ledge 6 is bonded to the marginal area 15 of composite panel P.

To ensure proper bonding a proper thickness of the coating of sealable material is essential. When, for example, polyethylene is the chosen material, the coating should have a thickness of at least 0.5 mils and preferably a thickness of 1.5 mils. Bonding is improved between the ring 1 and the composite panel P if there is no printing on the opaque paper board central panel 2 in the marginal area 15 where the composite panel P is in face to face registration with the bottom 18 of ledge 6 of the ring 1.

As seen in FIG. 6, the composite lid L and the container C are fitted together by placing the lower half of the depending skirt 11 over the outer edge of the container rim 13. The annular elongated depending skirt 7 facilitates an easy fit of the composite lid L over the container C and adds strength to the annular plastic lid ring 1. The support provided by the annular elongated depending skirt 7 prevents the problem of a composite lid L becoming so distorted due to upward or downward pressure on the composite lid L that the lip 9 in FIG. 4 would pull away from the container rim 13.

As seen in FIG. 4, the composite lid L is forced over the container rim 13 and the lid L snaps into place. The lip 9 of the annular plastic ring 1 fits beneath the bead 19 of the container rim 13 providing a snug fit.

In FIG. 5, another feature of the invention is shown to be the ability to stack the container C on top of a composite lid L. The bottom edge 21 of container C fits between the inside edge 22 of the upwardly projecting, outer, annular appendage 8. This annular appendage 8 is molded as part of the annular plastic lid ring 1. The annular appendage 8 adds strength to the composite lid L in general and more specifically to the annular plastic lid ring 1. The annular appendage 8 supports the composite lid L when upward or downward pressures are exerted on the lid L. This prevents lip 9 from pulling away from the container rim 13.

Although the preferred embodiment of the invention is described to be round it is the intention of the inventors not to limit the invention to only a round composite lid and container closure arrangement. Any lid ring, composite panel and container shape is considered to be included by this invention. This includes square, rectangular, hexagonal and other shapes, however not limited to the before mentioned shapes.

To construct the composite lid L of the present invention one begins by molding a ring 1 so that it includes a ledge 6, which surrounds a central opening 14, a skirt 7 and an upwardly projecting appendage 8. Preferably, the skirt 7 includes an inwardly extending lip 9.

Next, a composite panel P is constructed. The composite panel P is formed so that it completely covers the central opening 14 in the ring 1. The composite panel P also inoludes a marginal area 15 which, when the composite lid L is assembled, is in face-to-face registration with the bottom 18 of ledge 6 at its periphery. The composite panel P includes an opaque paper board central panel core 2 to which printing may be applied. If printing is applied, it preferably is not present in the marginal area 15 where the disk is intended to be in face-to-face registration with the ledge 6 of the ring 1. Next, a sealable coating is applied to the top 4 of the central panel 2. This coating is preferably polyethylene and has a minimum thickness of 0.5 mils. The paper board central panel core 2 preferably includes a cutout section 16 through which the contents of the container C may be viewed. When a cutout section 16 is present a transparent plastic membrane 3 is laminated to the bottom 5 of the paper board central panel core 2. If there is no cutout section 16, a sealable coating (like the coating applied to the top 4) is applied to the bottom 5 of the paper board central panel 2.

Figure 3:
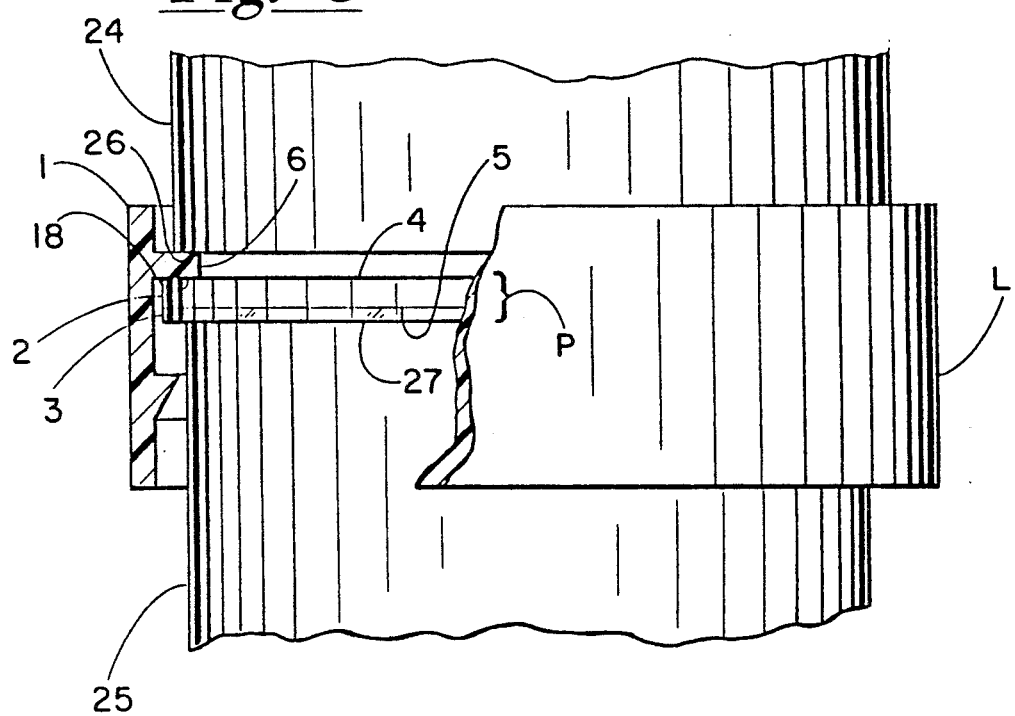
FIG. 3 is a fragmentary, vertical sectional view of a composite lid with the composite panel inserted and the ultrasonic horn and anvil in place for bonding.

To assemble and bond the composite panel P to the plastic lid ring 1 the following procedure is used. The composite panel P, comprising a central panel 2 and coatings of plastic material as described above, is fitted inside the annular plastic ring 1. As seen in FIGS. 1 and 3, the edge 23 of the composite panel P is pushed inside the lower half 11 of skirt 7 and past lip 9 to fit into the recessed area 12 of the plastcc ring 1. The marginal peripheral area 15 of the composite panel P fits snugly against the bottom 18 of ledge 6 of the plastic ring 1. At this point, an ultrasonic horn 24 is pressed against the top face 26 of ledge 6 with the bottom face 27 of composite panel P resting on a hard anvil surface 25. The arrangement may be reversed so the horn 24 rests on the bottom face 27 of composite panel P and the top fac 26 of ledge 6 of the plastic ring 1 rests on the anvil surface 25. The horn 24 is then activated and ultrasonic energy is produced, bonding the material of the plastic ring 1 and composite panel P together. This creates a quick setting, effective bond between the bottom 18 of ledge 6 and the coating on the top 4 of central panel 2. The horn 24 is then removed and a completed composite lid L comprising a plastic ring 1 and a composite panel P is removed from the anvil.

Figure 7:
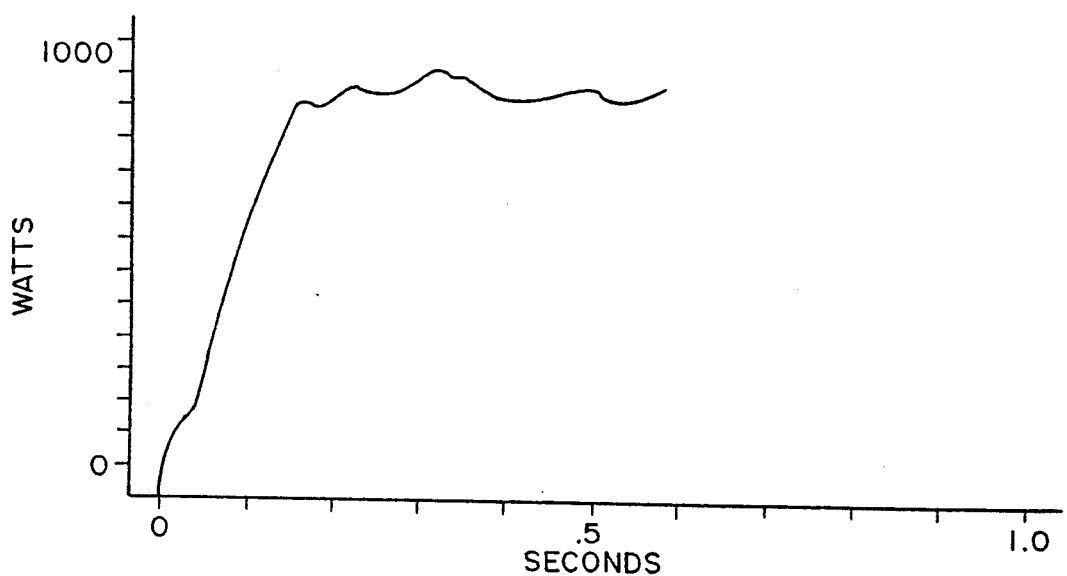
FIG. 7 is a graph of power over time for a typical ultrasonic bonding operation of the type described.
Figure 8:
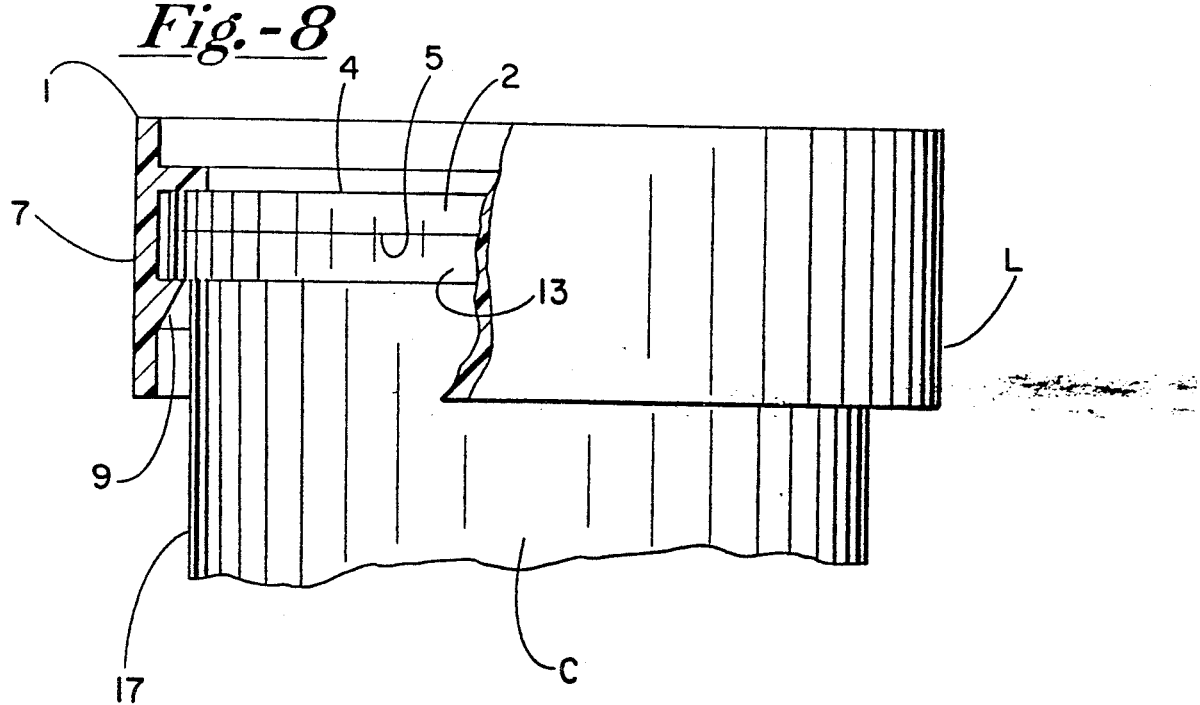
FIG. 8 is a fragmentary, vertical sectional view of the composite panel without a membrane bonded to the plastic lid ring and the composite lid securely fitted onto the container.

The process parameters preferably used during a typical bonding operation will depend upon the materials selected and the thickness of the coatings. Typically, a weld energy of about 500 watts, with a peak power of 1000–1200 watts would be used. Weld times of 0.5–0.6 seconds, with an additional hold time of 0.05 seconds and a weld pressure of 115 pounds per square inch are also used. A graph of power over time is shown for a typical bonding operation in FIG. 7. It must be remembered that the scope of the invention is not limited to the precise values or ranges given for the various ultrasonic bonding parameters and coating thicknesses. Any ultrasonic power, time and pressure values used with coating thicknesses that achieve a bond between the materials is considered to be part of this invention.

This invention has been described herein in considerable detail in order to comply with the Patent Statutes and to provide those skilled in the art with the information needed to apply the novel principles and to construct and use such specialized components as are required. However, it is to be understood that the invention can be carried out by specifically different equipment and devices, and that various modifications, both as to the equipment details and operating procedures, can be accomplished without departing from the scope of the invention itself.

What is claimed is:

1. A composite lid, for use nn a closure arrangement with a container, comprising:
    a) an annular plastic lid ring formed of a semi-rigid molded plastic and including:
        i) a horizontally inwardly extending ledge which surrounds a central annular opening in the ring;
        ii) an outer depending annular skirt with an annular inwardly extending lip;
        iii) an outer upwardly projecting annular appendage;
    b) a composite panel comprising a central panel formed of a relatively thin printable sheet material, with a plastic coating on the top and bottom, said composite panel being dimensioned to cover the central annular opening of the ring and include a marginal area, said marginal area being in face to face registration with the horizontal ledge of the lid ring and ultrasonically bonded thereto.

2. The composite lid of claim 1, where the top face of the horizontal ledge of the annular plastic lid ring serves as a platform for the bottom of a container, with the enclosure arrangements, composite lid and container, stacked one enclosure arrangement on top of another.

3. The composite lid according to claim 1, where the lower half of the outer depending annular skirt, as defined by the inwardly extending annular lip on the skirt, provides an improved mechanism for fitting the composite lid over the rim of the container before snapping the lid into place with a downward applied force.

4. The composite lid of claim 1 wherein said plastic coating is polyethylene.

5. The composite lid of claim 4 wherein said plastic coating on the top and bottom of the central panel are each 5 mils minimum thickness.

6. The composite lid of claim 1 wherein the printable sheet is opaque and includes a cutout section covered by a transparent membrane through which the contents of the container may be viewed.

7. The composite lid of claim 6 wherein the transparent membrane is polyethylene.

8. The composite lid of claim 7 wherein said plastic membrane on the bottom of the central panel is 1–1.5 mils thick.

9. A method for forming a composite lid for sealing a container comprising the steps of:
    a) forming a plastic lid ring of a semi rigid plastic, said lid ring including an outer skirt, a horizontal ledge having a top face and a bottom face projecting inwardly from the skirt, an annular opening surrounded by said ledge, and an outer upwardly projecting annular appendage;
    b) forming a composite panel by cutting a thin printable material to a size which:
        i) covers the annular opening of the lid ring;
        ii) includes a marginal area which, when the composite panel is in place, is in face to face registration with the horizontal ledge of th lid ring, and by applying a plastic coating to at least one side of said printable material;
    c) associating the composite panel with the plastic lid ring so that the annular opening of the lid ring is covered by the composite panel and the marginal area of plastic coated side of the composite panel is in face to face registration with a face of the horizontal ledge of the lid ring; and d) applying ultrasonic energy to the composite panel and the lid ring so that the marginal area of the composite panel bonds to the ledge of the lid ring.

10. Method in claim 9, where said plastic coating is polyethylene and within a range of 0.5 mils to 1.5 mils thick.

11. Method in claim 9, where said marginal area of the central panel has n printing in it.

12. Method in claim 9, where the ultrasonic bonding procedure uses a weld energy of 500 watts, a peak power of 1000-1200 watts, a weld pressure of 115 pounds per square inch, a weld time of 5-6 seconds and a hold time of 0.05 seconds.

* * * * *